US006547865B2

(12) United States Patent
Andrievsky et al.

(10) Patent No.: US 6,547,865 B2
(45) Date of Patent: Apr. 15, 2003

(54) INK JET PRINTING PROCESS

(75) Inventors: Andrei Andrievsky, Webster, NY (US); Bruce C. Campbell, Rochester, NY (US); Helmut Weber, Webster, NY (US); James A. Reczek, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 133 days.

(21) Appl. No.: 09/813,581

(22) Filed: Mar. 21, 2001

(65) Prior Publication Data

US 2002/0178969 A1 Dec. 5, 2002

(51) Int. Cl.[7] .................................................. C09D 11/02
(52) U.S. Cl. ..................................... 106/31.49; 347/100
(58) Field of Search ......................... 106/31.49; 347/100

(56) References Cited

U.S. PATENT DOCUMENTS

| | | | | |
|---|---|---|---|---|
| 4,554,555 A | | 11/1985 | Aruga et al. .............. 106/31.49 |
| 4,632,703 A | * | 12/1986 | Koike et al. .............. 106/31.46 |
| 5,123,960 A | * | 6/1992 | Shirota et al. ............ 106/31.46 |
| 5,759,254 A | * | 6/1998 | Macpherson et al. .... 106/31.13 |
| 5,922,116 A | * | 7/1999 | Mistry et al. ............. 106/31.47 |
| 6,190,422 B1 | * | 2/2001 | Carr ......................... 106/31.49 |
| 6,235,097 B1 | * | 5/2001 | Kenworthy et al. ..... 106/31.49 |
| 6,332,918 B1 | * | 12/2001 | Kenworthy ............... 106/31.49 |
| 6,379,780 B1 | * | 4/2002 | Laney et al. ................ 428/195 |
| 6,409,334 B1 | * | 6/2002 | Campbell et al. ........... 347/105 |
| 6,454,845 B1 | * | 9/2002 | Shawcross et al. ...... 106/31.49 |

FOREIGN PATENT DOCUMENTS

| | | |
|---|---|---|
| EP | 0 418 792 A1 | 3/1991 |
| WO | WO 98/49239 | 11/1998 |
| WO | WO 00/08103 | 2/2000 |

* cited by examiner

*Primary Examiner*—Helene Klemanski
(74) *Attorney, Agent, or Firm*—Harold E. Cole

(57) ABSTRACT

An ink jet printing process for improving the ozone stability an ink jet image comprising:

a) providing an ink jet recording element comprising a support having thereon a porous image-receiving layer having interconnecting voids; and b) applying droplets of a liquid ink on the image-receiving layer in an image-wise manner, the ink comprising water, humectant and a metallized, phthalocyanine dye, the metallized, phthalocyanine dye comprising the formula:

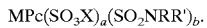

$MPc(SO_3X)_a(SO_2NRR')_b$.

10 Claims, No Drawings

INK JET PRINTING PROCESS

CROSS REFERENCE TO RELATED APPLICATION

Reference is made to commonly assigned, co-pending U.S. patent application Ser. No. 09/813,760 by Andrievsky et al., filed concurrently herewith entitled "Ink Jet Printing Process".

FIELD OF THE INVENTION

This invention relates to an ink jet printing process for improving the ozone stability of an ink jet image.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

The ink jet receiving elements that can be used with the above mentioned inks must meet several requirements including producing high density images that will not smear, bleed or wander when exposed to water for short periods of time.

U.S. Pat. Nos. 6,149,722 and 6,015,896, WO 00/08103 and WO 98/49239 relate to inks containing phthalocyanine dyes used in ink jet printing. However, there is no disclosure in these references that these inks would be useful with a recording element containing a porous image-receiving layer.

It is an object of this invention to provide an ink jet printing process for improving the ozone stability of an ink jet image.

SUMMARY OF THE INVENTION

These and other objects are achieved in accordance with the present invention which comprises an ink jet printing process for improving the ozone stability of an ink jet image comprising:

a) providing an ink jet recording element comprising a support having thereon a porous image-receiving layer having interconnecting voids; and b) applying droplets of a liquid ink on the image-receiving layer in an image-wise manner, the ink comprising water, humectant and a metallized, phthalocyanine dye, the metallized, phthalocyanine dye comprising the formula:

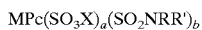

wherein:

M represents a metal; such as copper, nickel, aluminum, zinc, iron or cobalt.

Pc represents a phthalocyanine nucleus;

X represents hydrogen, alkali metal or an organic cation;

a is from 0 to 2;

R represents hydrogen; a substituted or unsubstituted alkyl group having from about 1 to about 15 carbon atoms, a substituted or unsubstituted aryl group, or a substituted or unsubstituted heterocyclic group;

R' represents an amino acid radical or at least one substituted or unsubstituted alkyl, aryl or heterocyclic substituent containing a primary, secondary, tertiary or quaternary amino group which may be part of a cyclic ring; and b is from 1 to 4, with the proviso that a+b is an average of from 3 to 4.

It was found that the ozone stability of an ink jet image was improved using the compounds described herein.

DETAILED DESCRIPTION OF THE INVENTION

In a preferred embodiment of the invention, the metallized, phthalocyanine dyes which may be used include the following:

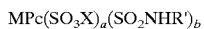

(M is Cu, and X, Pc, a and b being defined as above)

TABLE 1

| Dye | R' |
| --- | --- |
| 1 | —(CH$_2$)$_2$—(imidazolyl) |
| 2 | —(CH$_2$)$_3$—(4-methylpiperazinyl) |
| 3 | —(CH$_2$)$_2$—N$^⊕$(CH$_3$)$_3$ |
| 4 | —(CH$_2$)$_2$—NH$_3^⊕$ |

TABLE 1-continued

| Dye | R' |
|-----|-----|
| 5 | —(CH$_2$)$_2$—N(H)—C(NH$_2$)=NH$_2^\oplus$ |
| 6 | —(CH$_2$)$_3$—(N-methylimidazolium, N-CH$_3^\oplus$) |
| 7 | —(CH$_2$)$_3$—N$^\oplus$(CH$_3$)$_3$ |
| 8 | —(CH$_2$)$_3$—(morpholino) |
| 9 | HOOC—CH(—)—CH$_2$CH$_2$CH$_2$—N(H)—C(NH$_2$)=NH$_2^\oplus$ |
| 10 | —CH$_2$CH$_2$CH$_2$—N(CH$_3$)$_2$ |

MPc(SO$_3$X)$_a$(SO$_2$NHR')$_b$ (M is Ni, and X, Pc, a and b being defined as above)

TABLE 2

| Dye | R' |
|-----|-----|
| 11 | —(CH$_3$)$_2$—(imidazolyl) |
| 12 | —(CH$_2$)$_3$—(4-methylpiperazinyl) |

The dyes described above may be employed in any amount effective for the intended purpose. In general, good results have been obtained when the dye is present in an amount of from about 0.2 to about 5% by weight of the ink jet ink composition, preferably from about 0.3 to about 3% by weight. Dye mixtures may also be used.

The support for the ink jet recording element used in the invention can be any of those usually used for ink jet receivers, such as paper, resin-coated paper, plastics such as a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, and microporous materials such as microvoided polyester described in copending U.S. Ser. No. 09/650,129, filed Aug. 29, 2000, polyethylene polymer-containing material sold by PPG Industries, Inc., Pittsburgh, Pennsylvania under the trade name of Teslin® Tyvek® synthetic paper (DuPont Corp.), and OPPalyte® films (Mobil Chemical Co.) and other composite films listed in U.S. Pat. No. 5,244,861. The thickness of the support employed in the invention can be, for example, from about 12 to about 500 μm, preferably from about 75 to about 300 μm.

Antioxidants, antistatic agents, plasticizers and other known additives may be incorporated into the support, if desired. In a preferred embodiment, paper is employed.

In a preferred embodiment of the invention the porous ink-receptive layer contains inorganic particles such as silica, alumina, titanium dioxide, clay, calcium carbonate, barium sulfate, or zinc oxide. In another preferred embodiment, the porous ink-receptive layer comprises from about 30% to about 95% inorganic particles and from about 5% to about 70% polymeric binder, such as gelatin, poly (vinyl alcohol), poly(vinyl pyrrolidinone) or poly(vinyl acetate). The porous ink-receptive layer can also contain organic beads or polymeric micro-porous structures without inorganic filler particles as shown in U.S. Pat. Nos. 5,374, 475 and 4,954,395, the disclosures of which are hereby incorporated by reference. The porous image-receiving layer comprises from about 10% to about 95% inorganic particles and from about 5% to about 90% of a polymeric binder.

Examples of binders which may be used in the image-receiving layer include polyvinyl alcohol, polyvinyl pyrrolidone, poly(ethyl oxazoline), non-deionized or deionized Type IV bone gelatin, acid processed ossein gelatin or pig skin gelatin. The hydrophilic polymer may be present in an amount of from about 0.4 to about 30 g/m$^2$, preferably from about 1 to about 16 g/m$^2$.

The pH of the aqueous ink compositions of the invention may be adjusted by the addition of organic or inorganic acids or bases. Useful inks may have a preferred pH of from about 2 to 7, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. A preferred surfactant for the ink composition of the present invention is Surfynol® 465 (Air Products) at a final concentration of 0.1% to 1.0%.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

A typical ink composition of the invention may comprise, for example, the following substituents by weight: colorant (0.2–5%), water (20–95%), humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

In order to improve the adhesion of the image-recording layer to the support, the surface of the support may be subjected to a treatment such as a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount which is effective for the intended purpose. In general, good results are obtained when it is present in an amount of from about 2 to about 46 g/m$^2$, preferably from about 6 to about 16 g/m$^2$, which corresponds to a dry thickness of about 2 to about 42 $\mu$m, preferably about 6 to about 15 $\mu$m.

The following examples are provided to illustrate the invention.

EXAMPLES

Synthesis of Compound 1

Compound 1 as illustrated above was prepared as follows: Copper phthalocyanine (14 g) was added to chlorosulfonic acid (125 g) over 45 minutes, while keeping the temperature below 40° C. The mixture was then heated to 140–150° C. and stirred for 5 hours. After cooling to room temperature, thionyl chloride (49 g) was added dropwise over 30 minutes, and the mixture kept at 80° C. for 3 hrs. After cooling to room temperature, the mixture was poured on ice and stirred vigorously, while keeping the temperature below 5° C. The precipitate was filtered off, washed extensively with water at 5° C., and dried. 1-(3-Aminopropyl)-imidazole (24 g) and pyridine (90 g) were dissolved in 1-methyl-2-pyrrolidinone (70 mL). Phthalocyanine filter cake was dissolved in 1-methyl-2-pyrrolidinone (150 mL) and added all at once to the 1-(3-aminopropyl)-imidazole solution, and the reaction mixture stirred at room temperature for 3 hours, and then heated at 60° C. for 2 hours. Ether (1 L) was added, and the mixture stirred for 1 hour. Liqueurs were decanted, and the residue suspended in boiling isopropyl alcohol (500 mL), filtered, washed with isopropyl alcohol (100 mL), and dried to yield compound 1. The other compounds in Table 1 and nickel analogs were prepared in a similar manner.

Example 1

Cu Phthalocyanine Dye

Recording Element 1

A coating solution for a base layer was prepared by combining fumed alumina (Cab-O-Sperse® PG003, Cabot Corp.), poly(vinyl alcohol) (Gohsenol® GH-23A, Nippon Gohsei Co., Ltd.) and 2,3-dihydroxy-1,4-dioxane (Clariant Corp.) in a ratio of 88:10:2 to give an aqueous coating formulation of 30% solids by weight.

A coating solution for an image-receiving layer was prepared by combining fumed alumina (Cab-O-Sperse® PG003, Cabot Corp.), poly(vinyl alcohol) (Gohsenol® GH-23A, Nippon Gohsei Co.) and Polymer A in a ratio of 85:3:12 to give an aqueous coating formulation of 10% solids by weight. The fumed alumina particles have a primary particle size of from about 7 to about 40 nm in diameter and are aggregated up to about 150 nm. Surfactants Zonyl® FSN (E. I. du Pont de Nemours and Co.) and Olin® 10G (Dixie Chemical Co.) were added in small amounts as coating aids.

The above coating solutions were simultaneously bead-coated at 40° C. on polyethylene-coated paper base which had been previously subjected to corona discharge treatment. The image-receiving layer was coated on top of the base layer. The coating was then dried at 60° C. by forced air to yield a two-layer recording element in which the thicknesses of the bottom and topmost layers were 40 $\mu$m (43 g/m$^2$) and 2 $\mu$m (2.2 g/m$^2$), respectively.

Recording Element 2

The following commercially-available receiving element with a porous image-receiving layer was used: Konica Photo Quality Ink Jet Paper QP, No: KJP-LT-GH-15-QP PI.

Preparation of InventionCed Inks

Inks containing the dyes employed in the invention as illustrated above and identified in Table 3 were prepared with de-ionized water containing humectants of diethylene glycol and glycerol, each at 6%, a biocide, Proxel® GXL at 0.003 wt % and a surfactant, Surfynol® 465 (Air Products Co.) at 0.5 wt. %. In addition, for inks containing dyes 1, 8 and 10, lactic acid 1.0 wt. % was added. The dye concentrations were based on solution absorption spectra and chosen such that the final ink when diluted 1:1000, would yield a transmission optical density of approximately 1.0.

Preparation of Control Inks

These inks were prepared the same as the Invention Inks except that the following control dyes were used which are metallized phthalocyanine dyes but which have different substituents than those set forth in the invention:

C-1 Direct blue 199

C-2 CuPc(SO$_3$Na)$_a$(SO$_2$NH(CH$_2$)$_3$SO$_3$Na)$_b$

C-3 CuPc(SO$_3$Na)$_c$; c is from 2 to 4.

(Pc and a are defined as above in the formula)

Printing of Test Images

The above prepared inks were filtered through a 0.45 μm polytetrafluoroethylene filter and placed into an empty Lexmark ink cartridge, No: Lexmak 15MO120, and fitted into the ink station of a Lexmark Z-51 printer. A test image consisting of 4 variable density patches approximately 10 by 10 mm in size, and ranging from 25% dot coverage to 100% dot coverage was printed on to the following receiving elements: Element 1 above and Konica Photo Quality Ink Jet Paper QP, No: KJP-LT-GH-15-QP PI.

Evaluation of Test Images

For each ink, the Status A red reflection densities of the above described patches corresponding to 75% and 100% dot coverage were measured using an X-Rite 820 densitometer. The red density at 100% dot coverage (d-max) is listed in the Table 2 below. The stepped images were then placed in a dark chamber containing air and ozone gas at 5 ppm at 50% RH for 3 days. The Status A densities of the stepped images were re-measured and the retained dye % in Status A red density for the 75% dot coverage patches were calculated for each ink and are also listed in the following Table 2. A % retained value of greater than about 45% is considered to be acceptable.

TABLE 3

| Ink Containing Dye | Ozone Fade % Retained | |
|---|---|---|
| | Recording Element 1 | Recording Element 2 |
| 1 | 63 | 71 |
| 2 | 59 | 62 |
| 3 | 49 | 61 |
| 4 | 69 | 70 |
| 5 | 92 | 93 |
| 6 | 79 | 84 |
| 7 | 60 | 77 |
| 8 | 52 | 16 |
| 9 | 87 | 60 |
| 10 | 66 | 69 |
| C-1 | 24 | 23 |
| C-2 | 20 | 18 |
| C-3 | 20 | 19 |

The above results show that the combination of the metallized phthalocyanine dyes as described in the invention with a porous image-receiving layer produced less fade than the control dyes in the ozone test.

Example 2

Ni Phthalocyanine Dye

Preparation of Invention Inks

Inks were prepared similar to the invention inks in Example 1 above, except that they contained dyes 11 and 12.

Preparation of Control Ink

This ink was prepared the same as the above Invention Inks except that the following control dye was used which has different substituents than those set forth in the invention:

C-4 Nickel (II) phthalocyaninetetrasulfonic acid, tetrasodium salt (Aldrich Chemical Co.)

Printing of Test Images and Evaluation

The above prepared inks were printed and evaluated as in Example 1. The following results were obtained:

TABLE 4

| Ink Containing Dye | Ozone Fade % Retained | |
|---|---|---|
| | Recording Element 1 | Recording Element 2 |
| 11 | 92 | 100 |
| 12 | 100 | 90 |
| C-4 | 44 | 31 |

The above results show that the combination of the metallized phthalocyanine dyes as described in the invention with a porous image-receiving layer produced less fade than the control dyes in the ozone test.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process for improving the ozone stability of an ink jet image comprising:

a) providing an ink jet recording element comprising a support having thereon a porous image-receiving layer having interconnecting voids; and b) applying droplets of a liquid ink on said image-receiving layer in an image-wise manner, said ink comprising water, humectant and a metallized, phthalocyanine dye, said metallized, phthalocyanine dye comprising the formula:

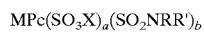

MPc(SO$_3$X)$_a$(SO$_2$NRR')$_b$ wherein:

M represents a metal;

Pc represents a phthalocyanine nucleus;

X represents hydrogen, alkali metal or an organic cation;

a is from 0 to 2;

R represents hydrogen; a substituted or unsubstituted alkyl group having from about 1 to about 15 carbon atoms, a substituted or unsubstituted aryl group, or a substituted or unsubstituted heterocyclic group;

R' represents an amino acid radical or at least one substituted or unsubstituted alkyl, aryl or heterocyclic substituent containing a primary, secondary, tertiary or quaternary amino group which may be part of a cyclic ring; and b is from 1 to 4, with the proviso that a+b is an average of from 3 to 4.

2. The process of claim 1 wherein said porous image-receiving layer having interconnecting voids comprises organic or inorganic particulate materials in a polymeric binder.

3. The process of claim 2 wherein said inorganic particles comprise silica, alumina, titanium dioxide, clay, calcium carbonate, barium sulfate, or zinc oxide.

4. The process of claim 1 wherein said porous image-receiving layer comprises from about 10% to about 95% inorganic particles and from about 5% to about 90% of a polymeric binder.

5. The process of claim 4 wherein said polymeric binder is gelatin, poly(vinyl alcohol), poly(vinyl pyrrolidinone) or poly(vinyl acetate).

6. The process of claim 1 wherein said R represents hydrogen.

7. The process of claim 1 wherein said R' represents
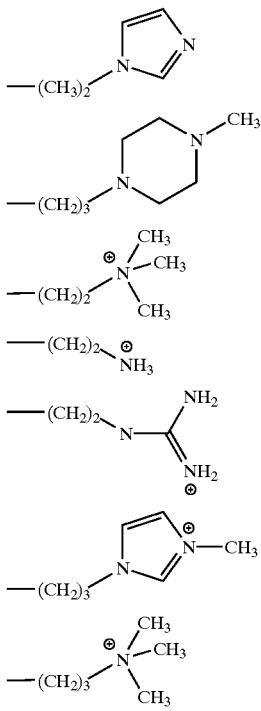
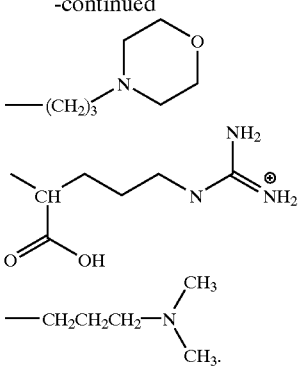
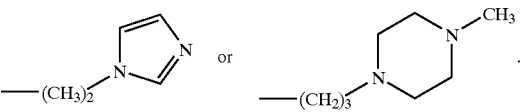
—CH₂CH₂CH₂—N(CH₃)₂.
8. The process of claim 1 wherein M represents copper, nickel, aluminum, zinc, iron, or cobalt.
9. The process of claim 7 wherein M represent Cu and R is H.
10. The process of claim 1 wherein M represent Ni, R is H, and R' is
—(CH₃)₂-imidazole or —(CH₂)₃-N-methylpiperazine.
* * * * *